(12) United States Patent
Henriksen

(10) Patent No.: US 6,323,624 B1
(45) Date of Patent: Nov. 27, 2001

(54) PROCEDURE TO CONNECT AN ASYNCHRONOUS GENERATOR ON AN ALTERNATING CURRENT AND AN ELECTRICAL CONNECTING FOR USE AT THIS PROCEDURE

(75) Inventor: Carsten Henriksen, Viborg (DK)

(73) Assignee: Mita-Teknik A/S, Rødkaersbro (DK)

( * ) Notice: Subject to any disclaimer, the term of this patent is extended or adjusted under 35 U.S.C. 154(b) by 0 days.

(21) Appl. No.: 09/446,125

(22) PCT Filed: Jun. 25, 1998

(86) PCT No.: PCT/DK98/00278

§ 371 Date: Dec. 27, 1999

§ 102(e) Date: Dec. 27, 1999

(87) PCT Pub. No.: WO99/00883

PCT Pub. Date: Jan. 7, 1999

(30) Foreign Application Priority Data

Jun. 26, 1997 (DK) .................................................. 0758/97

(51) Int. Cl.[7] .................................................. H02P 9/44
(52) U.S. Cl. ................................. 322/20; 322/29; 322/32
(58) Field of Search .......................... 290/44, 55; 322/7, 322/8, 20, 89, 99

(56) References Cited

U.S. PATENT DOCUMENTS

| 4,388,585 | | 6/1983 | Nola | 322/47 |
|---|---|---|---|---|
| 4,473,792 | * | 9/1984 | Nola | 322/47 |
| 4,656,413 | | 4/1987 | Bourbeau | 322/47 |
| 5,083,039 | * | 1/1992 | Richardson et al. | 290/44 |
| 5,652,485 | * | 7/1997 | Spiegel et al. | 318/147 |
| 5,663,631 | * | 9/1997 | Kajiura et al. | 322/29 |
| 5,798,631 | * | 8/1998 | Spee et al. | 322/25 |
| 5,798,632 | * | 8/1998 | Muljadi | 322/29 |
| 5,907,192 | * | 5/1999 | Lyons et al. | 290/44 |

FOREIGN PATENT DOCUMENTS

WO95/06975    3/1995   (WO) .

\* cited by examiner

*Primary Examiner*—Nicholas Ponomarenko
(74) *Attorney, Agent, or Firm*—Jacobson Holman, PLLC

(57) ABSTRACT

The invention relates to a procedure of connecting a polyphased asynchronous generator on a polyphased alternating voltage network. The connecting is carried out by means of an adjustable, electronic connecting based on thyristors or similar variable (adjustable) connecting items, the connecting degree of which is varied during a controlled connecting course, which is controlled in consideration of the wish of a "soft" connecting on the network and a limitation of the maximum amperage during the connecting course. During the whole connecting course a continuous determination of the generator phase angle $\phi$ is carried out, and on basis of this determination a continuous adjustment of thyristors—the aperture angle is carried out, thus the aimed, successive load connection of the generator on the network (soft-connecting) is obtained. Furthermore the procedure include a new method to determine the generator phase angle $\phi$ by registering the time of zero circulation on the phase voltage, and at the same time detection of the respective thyristor voltage zero circulation point at a measuring method based on measuring of the thyristor voltage. The novelty of the invention consists in adjusting the ignition point of the thyristors successively to the phase angle $\phi$, thus the connecting degree resulted to the thyristors is increased in a controlled speed regardless of the variations registered in the phase angle during the connecting course, i.e. in the principle the thyristor aperture angle is reduced, when $\phi$ increases and so on.

5 Claims, 2 Drawing Sheets

PROCEDURE TO CONNECT AN
ASYNCHRONOUS GENERATOR ON AN
ALTERNATING CURRENT AND AN
ELECTRICAL CONNECTING FOR USE AT
THIS PROCEDURE

BACKGROUND OF THE INVENTION

1. Field of the Invention

This invention regards a procedure to connect an asynchronous generator on an alternating current and an electrical connecting for use at this procedure. The procedure is further determined by a polyphased generator on a polyphased alternating voltage network which is based on thyristors or similar variable (adjustable) coupling elements, where the connecting is made by means of an adjustable electrical connecting. The connecting degree of the connecting elements can be diversified during a controlled connecting period, which is operated in consideration of the wish of a "soft" connecting on the network and a limit of the maximum amperage during the connecting period, the procedure of which consists more precisely in undertaking a continuous determination of the phase angle $\phi$ of the generator during the whole connecting period. On basis of the determination a continuous adjustment of the connecting degree of the coupling elements is made (aperture angle, when thyristors is the question). In this way the aimed, successive load connecting of the generator is reached on the network (soft connecting), and the procedure includes furthermore a method to determine the generator phase angle $\phi$ by registering the time of zero passage of the phase voltage and a simultaneous detection of the respective thyristor power-zero passage period. As the difference between the two periods indicates an expression of the phase angle $\phi$ in the respective phase.

The connecting can be an electrical connecting for the discharge of the procedure.

2. Description of Related Art

If an asynchronous motor is driven below the synchronous orbital number, the machine will operate as an electrical generator transferring the induced mechanic axle output to electrical power. Provided that the machine—now as an asynchronous generator—is connected to an alternating voltage network, the generated current will be sent into this. This characteristic is used in fashion wind turbines and similar energy systems for utilisation of stochastic energy sources. It is to be noticed that to this purpose asynchronous machines developed specially to generator running used.

Especially, in connection with wind turbines, the connecting of the network involves large difficulties due to the unstable nature of the wind. If one imagined that the wind speed can be adjusted as another controllable operating parameter, one could slowly increase the wind until the rotor of the wind turbine is only rotating with a speed corresponding to synchronous generator orbital number. When the phases are adjusted in synchronous, the connecting of the network can be made by means of a relay or a similar simple electrical contact machine without involving pulse on the network or torque transitions in the turbine system (i.e. rotor, gear and generator). But it is not that simple in the real world.

In practice one naturally has to take account the varying speed and inconstant, incalculable nature of the wind. It is a serious problem in connection with wind turbines that especially the speed wind and hereby the contents of energy can change very fast. Therefore, at strong gusts, the wind turbine rotor can be sped up below the synchronous orbital number in a very short time, provided that one initiate from a no-load state, where the turbine rotates with under-synchronous speed, and when the generator therefore is unloaded. The connecting of the generator to the network has to happen in this very moment when the synchronous speed is passed, or the wind turbine will bolt. It is necessary to undertake the connecting "soft" in order to provide unacceptable big pulses of the network and torque pulses of the rotor during the connecting course. It means that during the connecting period the power transmission between the generator and the network has to be increased gradually from a miminum until completely connected to power. This demand is, however, contradicted to the demand of a fast connecting of the generator on the network, when the dynamic conditions around the turbine demand this, i.e. when the wind turbine is exposed for strong gusts as described. In practice, it is necessary to choose a compromise, where the connecting of the generator is maintained during a controlled connecting period, thus the effect partly on the network, partly the construction of the wind turbine as such (torque load of gear and rotor shaft, influences of bends on the wings etc.) are kept within acceptable limiting values. For this purpose, different types of electrical connectings and different generator connectings and controlling principles are developed.

The basis of the connecting adjustment in the connection known is for instance measuring of resulting generator voltage. Here the question of making connecting adjustment on basis of an indirect measuring, as the generator voltage and the generator current intensity depend on many factors. Therefore one cannot work out a precise adjustment without resulting in moment transitions between the network and the turbine during different operating conditions, especially during the connecting period. At such known adjustments, it can be difficult to keep the moment transitions, and from these following pulses in the network within the limits made by the owner of the network. It is especially difficult to decrease the moment transitions, when the generated effect is small in proportion to the normal power of the generator.

An electrical connecting is described below, where the connecting of the network is carried out by means of thyristors or similar variable, adjustable connection elements known from the description to U.S. Pat. No. 4,656,413 to Bourbeau. The aperture angle of the thyristors—and hereby the connecting degree—is controlled by means of measuring of the generator voltage and the generator current. Beyond this the revolution number of the generator is measured with a revolution counter for determination of safety limits, and the system has further more means for measuring of the wind speed. When the wind speed is below a fixed level, the electrical connection between the network and the generator is disconnected. In practice, it has appeared from the connecting and the way of operation that the consumption cannot be under 4–8%, especially to excitation of the asynchronous generator. When the wind turbine is in low wind position, i.e. when the turbine is connected to the network and the generator only produces miminal power, then the consumption is still 4–8% of the maximum effect, which the generator can produce. It is clear that this is unacceptable from an economic point of view. Beyond this the electrical connecting indicates a controlling form, where the generator is disconnected by low wind operation to avoid that the network pulls the generator as a motor. The result of this includes repeated connecting and disconnecting during this operation state. Every connection involves unwanted torque impacts on the rotor system and a pulse on the network.

Regardless of the gradual increase of the thyristor aperture angle after a programme prepared in advance (ramp) and due to this following gradual connecting degree on the network during the passage of the asynchronous generator of the asynchronous circulation number, an unwanted great big pulse appears in the system during the connecting period. The easiest way to explain this pulse is that the phase angle φ of the asynchronous machine increases significantly, when the machine converts from motor running until generator running, i.e. during the passage of the synchronous rotation number. The phase angle φ affects the efficient thyristor opening time, thus the opening time increases, when φ increases (provided that the thyristor opening angle is unchanged). It means that a gradual increase of the thyristor opening angle not alone is enough to ensure a "soft" connecting process without pulses. It is said in a popular way that the thyristor connecting is self-increasing in a narrow rotation interval around synchronous rotation number. A more intelligent control of the thyristors is necessary, where among several operation parameters it is necessary to pay regard to changes in the phase angle φ during the process, if an intended limit of the amperage is to be achieved during the connecting process and immediately after this.

The wish of a limit of the connecting strength is not only due to the technical condition about the turbine construction—here one thinks of a prolonged mechanic service life of gears and wings, etc., when the torque impacts are limited—but also due to the fact that today several network owners demand that the wind power system current connected complies with the further specified demands of a maximum connecting amperage. The purpose of the present invention is just to show a connecting principle and a connecting meeting this demand.

SUMMARY OF THE INVENTION

By choosing a procedure of a polyphased generator on a polyphased alternating voltage network based on thyristors or similar variable (adjustable) coupling elements, the connecting is made by means of an adjustable electrical connecting. The connecting degree of the connecting elements can be diversified during a controlled connecting period, which is operated in consideration of the wish of a "soft" connecting on the network and a limit of the maximum amperage during the connecting period, the procedure of which consists more precisely in undertaking a continuous determination of the phase angle φ of the generator during the whole connecting period. On basis of the determination, a continuous adjustment of the connecting degree of the coupling elements is made (aperture angle, when thyristors is the question). In this way, the aimed successive load connecting of the generator is reached on the network (soft connecting), and the procedure includes furthermore a method to determine the generator phase angle φ by registering the time of zero passage of the phase voltage and a simultaneous detection of the respective thyristor power-zero passage period. As the difference between the two periods indicates an expression of the phase angle φ in the respective phase.

As an example, at utilisation of an electrical connecting for the discharge of the procedure, the electronic circuit is constructed with two opposite directed light-emitting diodes installed parallel over its own thyristor in a certain phase conductor. In this way, every single light-emitting diode is on, when the respective is off, i.e. when there is voltage over the thyristor, and off when the thyristor is on. Against every light-emitting diode an opto-coupler, photodetector or a similar optical item, which can be activated, is installed for detection of the lightning point of the light-emitting diodes. This point just indicates the power zero-passage of the thyristors (=the extinction moment of the thyristors) and forms part of the determination of the phase angle φ between power and voltage in the phase in question. In principle the electrical connecting mentioned above is formed by the two opposite directed thyristors parallel connected in each phase, an electronic ignition circuit, which contains calculation and data facilities, by way of an example in shape of a microprocessor based computer for calculating of the lightning point, alternatively in shape of an analogous adjustment circuit with the same function and an electronic measuring circuit to detect the phase angle.

One achieves the intended stepless, adjustable connecting, which enables a controllable limit of the generator amperage during and after the passage of the synchronous rotation number. The thyristor connecting degree is adjusted continuously by controlling of the ignition point (the aperture angle of the thyristor) during the whole connecting period. At any time, the ignition point is calculated on the basis of the phase angle φ among other things, but also the other operation parameters can be included in the calculation, among other things the rotation number of the generator, the acceleration of the generator and the generated amperage. According to the invention, the calculation can be made by means of an algorithm installed in a microprocessor based computer according to the constructing of the electronic circuit with two opposite directed light-emitting diodes installed parallel over its own thyristor in a certain phase conductor. In this way every single light-emitting diode is on, when the respective is off, i.e. when there is voltage over the thyristor, and off when the thyristor is on. Against every light-emitting diode an opto-coupler, photodetector or a similar optical item, which can be activated, is installed for detection of the lightning point of the light-emitting diodes. This point just indicates the power zero-passage of the thyristors (=the extinction moment of the thyristors) and forms part of the determination of the phase angle φ between power and voltage in the phase in question. In principle the electrical connecting mentioned above is formed by two opposite directed thyristors parallel connected in each phase, an electronic ignition circuit, which contains calculation and data facilities, by way of an example in shape of an analogous adjustment circuit with the same function and an electronic measuring circuit to detect the phase angle. The specific characteristics of the generator in question can also be installed in the computer as a generator parameter set, in this way no specific algorithms are to be developed to every new generator type.

It is necessary to know the current zero circulation point of the thyristors in the phase in question in order to decide the phase angle φ of the generator according to the connecting procedure of a polyphased generator on a polyphased alternating voltage network which is based on thyristors or similar variable (adjustable) coupling elements, where the connecting is made by means of an adjustable electrical connecting. The connecting degree of the connecting elements can be diversified during a controlled connecting period, which is operated in consideration of the wish of a "soft" connecting on the network and a limit of the maximum amperage during the connecting period, the procedure of which consists more precisely in undertaking a continuous determination of the phase angle φ of the generator during the whole connecting period. On basis of the determination a continuous adjustment of the connecting degree of the coupling elements is made (aperture angle, when thyristors is the question). In this way, the aimed successive load connecting of the generator is reached on the network (soft connecting), and the procedure includes furthermore a method to determine the generator phase angle φ by registering the time of zero passage of the phase voltage and a simultaneous detection of the respective thyristor power-zero passage period. As the difference between the two periods indicates an expression of the phase angle φ in the respective phase.

According to the invention, the determination of the zero circulation can happen by indirect measuring of the voltage over the thyristor with the detection of the power zero passage point of the thyristor by measuring the voltage of the thyristor.

By using the optoconnection principle for detection of zero circulation, the electrical connecting for the discharge of the procedure is characterized by constructing the electronic circuit with two opposite directed light-emitting diodes installed parallel over its own thyristor in a certain phase conductor. In this way, every single light-emitting diode in on, when the respective is off, i.e. when there is voltage over the thyristor, and off when the thyristor is on. Against every light-emitting diode an opto-coupler, photo-detector or a similar optical item, which can be activated, is installed for detection of the lightning point of the light-emitting diodes. This point just indicates the power zero-passage of the thyristors (=the extinction moment of the thyristors) and forms part of the determination of the phase angle φ between power and voltage in the phase in question. In principle, the electrical connecting mentioned above is formed by the two opposite directed thyristors parallel connected in each phase, an electronic ignition circuit, which contains calculation and data facilities, by way of an example in shape of a microprocessor based computer for calculating of the lightning point, alternatively in shape of an analogous adjustment circuit with the same function and an electronic measuring circuit to detect the phase angle.

Accordingly, a precise and firm determination of time for zero circulation and hereby the phase angle φ is secured. The optoconnection principle distinguishes itself by being insensitive to transients and other sorts of electrical and electromagnetic noise. The measuring results of current, voltage and zero circulation in the phase in question are sent to the computer mentioned (or the analogue circuit, if used), which on the basis of the phase angle calculates the ignition point of the thyristors. The adjustment is made, thus the connecting degree resulted of the thyristors are increased in a controlled rate during the connecting process regardless of the variations registered in the phase angle, i.e. the main thing is that the thyristor aperture angle is reduced, when φ increases and so on. At the adjustment, it takes primarly into consideration that the amperage produced by the generator does not exceed a certain maximum value during and after passage of the synchronous rotation number. For obvious reasons, it means a soft, careful connecting of the generator without torque impacts, i.e. according to the invention the connection secures in the best way gear, rotor shaft, wings and other vital mechanic components a service time as long as possible.

BRIEF DESCRIPTION OF THE INVENTION

The invention can be explained further in connection with the drawing, where

DESCRIPTION OF THE INVENTION

Figure 1:
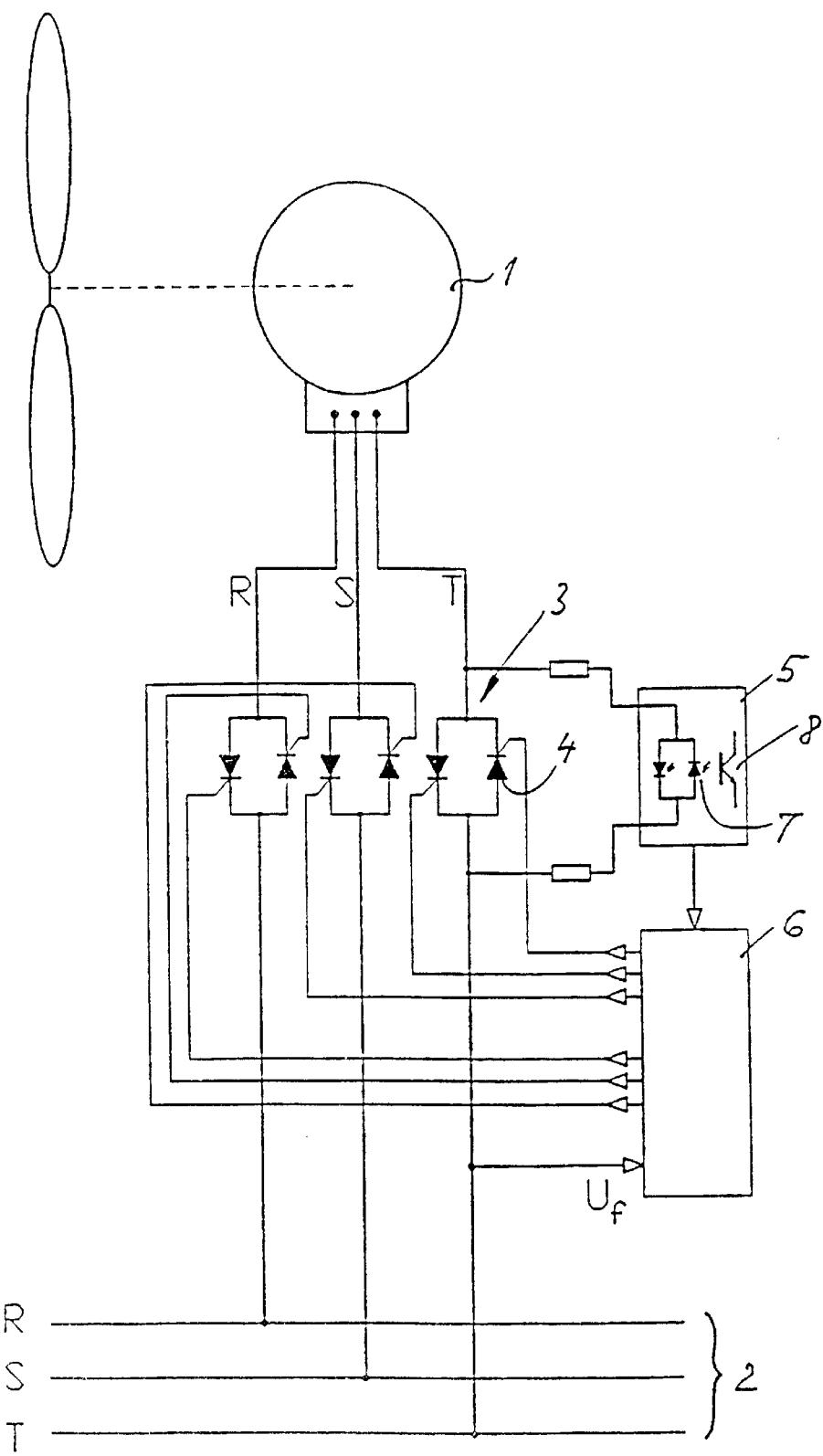
FIG. 1 shows a diagram of an electrical connection according to the invention.

The electrical connecting shown in FIG. 1 as an example between an asynchronous wind turbine generator 1 and a three-phased alternating voltage network 2 is based on a thyristor battery 3, which consists of totally six single-thyristors 4. The thyristors 4 are installed in their own phase conductor R, S, T two and two, so the two thyristors in every phase are connected interdependent parallel and placed opposite. Besides the thyristors 4 work in a traditional way by opening their own semi-period during a whole alternating current period, when the thyristors 4 are lit with complete aperture angle. If the thyristors 4 only are lit partly, i.e. with an aperture angle less than 180°, then the efficient opening time and hereby the connecting degree will be reduced correspondingly. This characteristic is used to adjust of the connecting as already described.

Furthermore, the electrical connecting includes a measuring circulation 5 for determination of the phase angle φ and an ignition circulation 6 for generation of ignition impulses to the thyristors 4. The ignition circulation 6 contents to this purpose calculation and data facilities, which on the basis of different measured operation parameters—among others the phase angle p and generated amperage—and the fixed installed system data—for instance the data set of the generator—calculates the ignition point, i.e. the aperture angle by means of a suitable algorithm.

The measuring circulation 5 is based on a new optical principle, where the current zero circulation of every single thyristor is detected by a light-emitting diode 7 connected parallel over the thyristor 4 and with the same guide direction as this one. The light-emitting diode 7 is lit at a voltage of approx. 70 V, i.e. the light-emitting diode 7 is off, when the thyristor 4 is on, and on when the voltage of the thyristor 4 is more than 70V, i.e. when the thyristor 4 is blocked. As the thyristor 4 always goes in blocked condition, when the current goes through zero, therefore this point will always be detected by the light-emitting diode 7, expressed by the simultaneous lightning of the light-emitting diode 7 (i.e. dispatch of light, which can be detected). The light-emitting diode 7, however, does not light before the voltage of the thyristor 4 has increased to more than 70V, i.e. with a certain delay. As regards periods this offset is without practical importance. In the calculation the phase angle can be adjusted with regard to the offset of light-emitting diode.

The light-emitting diode 7 is explored by photo demodulator 8 placed opposite the light-emitting diode 7. Alternatively, a suitable opto-connecting can be used as replacement for light-emitting diode/photo demodulator set 7,8. At the light emission of the light-emitting diode 7, the photo demodulator 8 gives a signal, which is forwarded to the light cycle 6. The light cycle 6 receives furthermore a voltage signal $U_f$ from the respective phase T, and from this signal the voltage and zero passage of the phase is detected. On the basis of the two time values of power-zero passage and voltage-zero passage respectively the phase angle φ is fixed. The measuring system is qualified by being simple and valid (precisely), and the system is insensitive to electrical transients at the same time.

Figure 2:
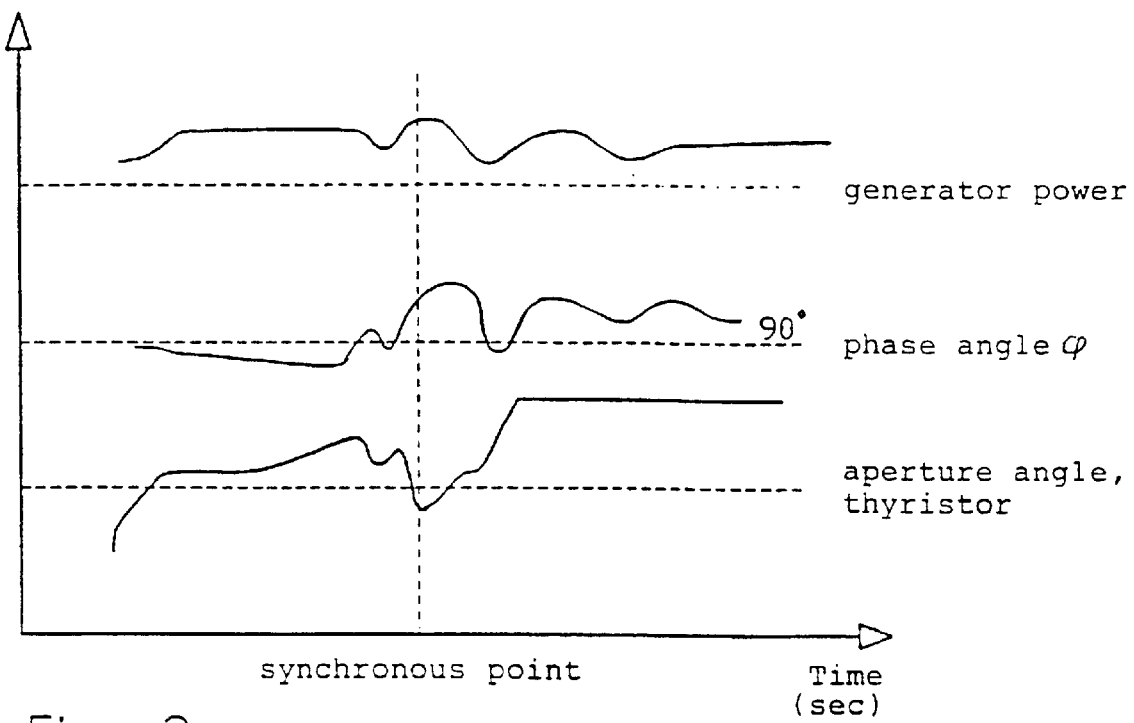
FIG. 2 is an example of the process about the connecting time (synchronous orbital number) for current, phase angle and thyristor aperture angle shown in curve form.
Figure 3:
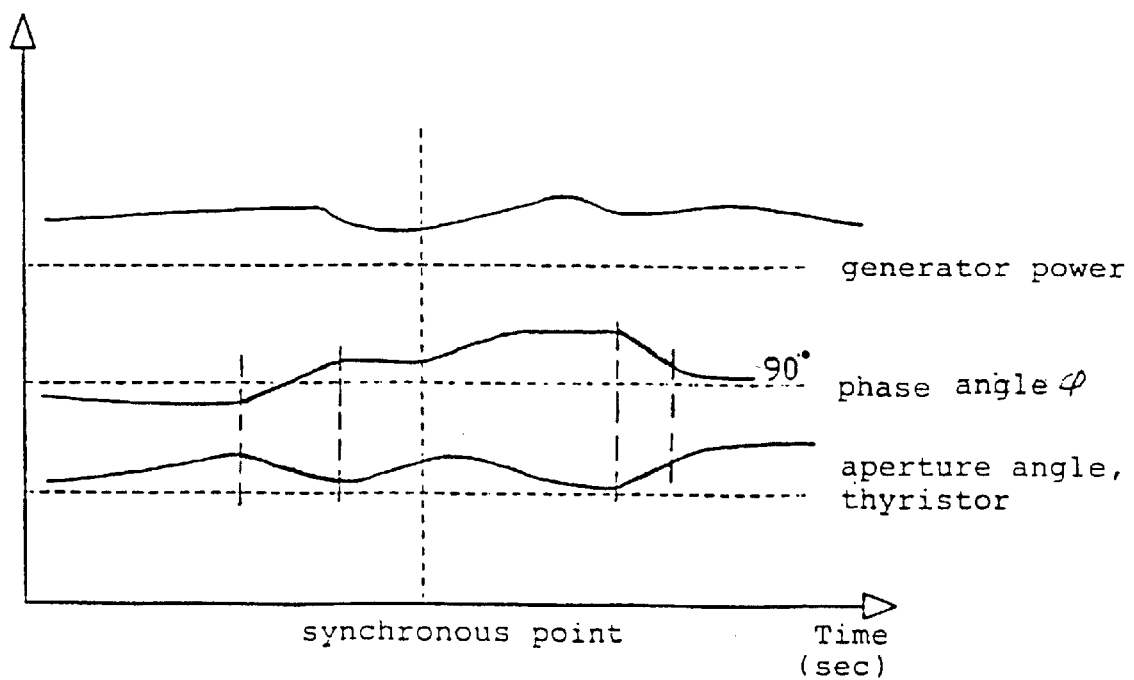
FIG. 3 is an enlarged section of the same curves shown in a more narrow interval around the synchronous circulation number.

The curves of FIGS. 2 and 3 exemplify how the thyristor-ignition angle can be adjusted as a function of the phase angle ϕ during the connecting period. Also, one can refer to the explanation of the adjustment principles already stated in the introductory part of the description. It is marked on the curves in FIG. 3 how the thyristor aperture angle in principle is reduced when ϕ increases and so on.

The invention is not limited to the drawings shown and the above described version. Other connecting combinations, other detail designs and other constructive solutions of the single elements are imaginable within the frames of this invention, just as it is possible to increase the use of the connecting to other fields than the ones here stated. As an example, the procedure and the connecting can also be used for connecting of an asynchronous generator at an oversynchronous and undersynchronous orbital number.

What is claimed is:

1. A connecting procedure for a polyphased generator on a polyphased alternating voltage network, said connecting procedure being based on variable adjustable coupling elements, where the connecting is made by said adjustable electrical connecting elements having connecting degrees for the connecting of the elements which can be diversified during a controlled connecting period, said controlled connecting period being operated in consideration of a "soft" connecting on the network and a limit of a maximum amperage during the connecting period, the procedure of which consists in undertaking a continuous determination of a phase angle ϕ of the generator during the whole connecting period, and a continuous adjustment of the connecting degree of the coupling elements is made wherein successive load connecting of the generator is reached on the network, and the procedure includes the steps of:

determining the generator phase angle ϕ by registering a time of zero passage of a phase voltage and a simultaneous detection of a respective thyristor power-zero passage period;

indicating a difference between the two periods as an expression of the phase angle ϕ in the respective phase;

adapting the phase angle ϕ successively at an ignition time of the thyristors, wherein the resulted connecting degree of the thyristors will be increased in a controlled rate regardless of the variations registered in the phase angle during the connecting period, and the thyristor aperture angle is decreased, when ϕ increases; and considering the adjustment that the amperage produced by the generator does not exceed a certain maximum value during and after the passage of the synchronous rotation number.

2. The procedure according to claim 1, wherein the detection of the power zero passage point of the thyristors happens by measuring a voltage of the thyristor.

3. The procedure according to claim 1, further comprising the steps of:

inaugurating an algorithm in electronic circuit to control the connecting elements; and calculating current at the ignition point on a basis of the registered phase angle ϕ with regard to other relevant calculation parameters, which can be specific for the asynchronous generator in question, and which can be determined by calculation and/or at empirical way.

4. The procedure according to claim 1, comprising the step of:

undertaking a tradition control of the generator in combination with the step of connecting degrees of a phase angle detection, such as in a known PD- or PID regulating principle, where the amperage produced by the generator forms as a primary adjustment parameter, and where there is shown consideration to the frequency and acceleration of the generator.

5. The procedure according to claim 1, further comprising the steps of:

constructing the electronic circuit with two opposite directed light-emitting diodes installed parallel over the thyristor in a certain phase conductor wherein when there is voltage over the thyristor, and off when the thyristor is on;

installing against every light-emitting diode an optocoupler, photodetector or a similar optical item, which can be activated for detection of the lightning point of the light-emitting diodes;

forming by two opposite directed thyristors parallel connected in each phase, an electronic ignition circuit, which contains calculation and data facilities; and providing an electronic measuring circuit to detect the phase angle.

* * * * *